United States Patent Office 3,632,633
Patented Jan. 4, 1972

3,632,633
PROCESS FOR PREPARING ACYLOXY-
CYCLOALKENES
James J. Louvar, Evanston, Ill., assignor to Universal
Oil Products Company, Des Plaines, Ill.
No Drawing. Filed Sept. 16, 1968, Ser. No. 760,070
Int. Cl. C07c 69/14, 69/44, 69/62
U.S. Cl. 260—497 R                                      10 Claims

ABSTRACT OF THE DISCLOSURE

Acyloxycycloalkenic compounds are prepared by contacting a mixture of a carboxylic acid and a cycloalkene compound with an activated crystalline alumino-silicate at reaction conditions to form the desired product.

---

This invention relates to a process for preparing acyloxycycloalkenic compounds, and particularly to a process for preparing the desired products utilizing certain catalytic compositions of matter of a type hereinafter set forth in greater detail.

Cycloalkenic compounds which contain an acyloxy substituent on the ring are utilized as intermediates in the preparation of many important chemical compounds and compositions of matter. For example, 2-cyclohexen-1-yl acetate may be hydrolyzed to form 2-cyclohexen-1-ol. The compound may then be dehydrogenated by any manner known in the art to form phenol. This compound is well known in the chemical art and can be used in phenolic resins; epoxy resins; as an intermediate in preparing nylon; as a weed killer; as a selective solvent for refining lubricating oils; as an intermediate in preparing salicylic acid; etc. 2-cyclohexen-1-ol may also be dehydrated to form cyclohexadiene. This compound may be useful in preparing Diels-Alder adducts such as, for example, with maleic anhydride to form a compound which is useful as a monomer in preparing polyesters and polyamides. Other acryloxycyclicalkenic compounds will likewise be utilized in other chemical syntheses.

It is therefore an object of this invention to provide a novel process for preparing acyloxycycloalkenic compounds.

A further object of this invention is to prepare acyloxycycloalkenic compounds utilizing a crystalline alumino-silicate as the catalytic agent.

One aspect of this invention is found in a process for the acyloxylation of a cycloalkene which comprises treating a cycloalkene with a carboxylic acid in the presence of a catalyst comprising the hydrogen form of a crystalline aluminosilicate at a temperature in the range of from about ambient to about 250° C. and a pressure in the range of from about atmospheric to about 100 atmospheres, and recovering the resultant acyloxycycloalkene.

A further aspect of this invention is found in a process for preparing 2-cyclohexen-1-yl acetate by treating cyclohexene with acetic acid in the presence of a catalyst comprising the hydrogen form of a faujasite at a temperature in the range of from about ambient to about 250° C. and at a pressure in the range of from about atmospheric to about 100 atmospheres to form 2-cyclohexen-1-yl acetate.

Other objects and embodiments will be found in the following further detailed description of the present invention.

As hereinbefore set forth, the present invention is concerned with a process for preparing acyloxycycloalkenic compounds by treating a cycloalkenic compound with a carboxylic acid in the presence of a catalyst comprising an activated crystalline alumino-silicate compound. The reaction is usually effected at reaction conditions which include a temperature in the range of from ambient (about 25° C.) up to about 250° C. or more and at a pressure in the range of from about atmospheric to about 100 atmospheres or more. In the event that superatmospheric pressures are employed to effect the reaction of the present invention, said pressures will usually be provided for by the introduction of a substantially inert gas such as nitrogen into the reaction zone, said pressure which is used being that which is sufficient to maintain a major portion of the reactants in the liquid phase.

Cycloalkenic compounds which may be used as the starting material in the process of this invention will possess the generic formula:

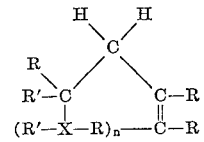

in which R is selected from the group consisting of hydrogen, alkyl of from about 1 to about 20 carbon atoms, aryl, cycloalkyl, alkaryl, aralkyl, halogen, nitro, amino, alkoxy and heterocyclic radicals, R' may be R or together may form an aromatic nucleus which may contain R substituents and $n$ is an integer of from 1 to about 4. Some specific representative examples of these compounds will include cyclopentene, cyclohexene, cycloheptene, cyclooctene, 3-chlorocyclopentene, 3-chlorocyclohexene, 3-chlorocycloheptene, 3-bromocyclopentene, 3-bromocyclohexene, 3-bromocycloheptene, 3-indocyclopentene, 3-iodocyclohexene, 3-iodocycloheptene, 3-fluorocyclopentene, 3-fluorocyclohexene, 3-fluorocycloheptene, 3-nitrocyclopentene, 3-nitrocyclohexene, 3-nitrocycloheptene, 3-aminocyclopentene, 3-aminocyclohexene, 3-aminocycloheptene, 3-methylcyclopentene, 3-methylcyclohexene, 3-methylcycloheptene, 3-ethylcyclopentene, 3-ethylcyclohexene, 3-ethylcycloheptene, 3-propylcyclopentene, 3-propylcyclohexene, 3-propylcycloheptene, 3-isopropylcyclopentene, 3-isopropylcyclohexene, 3-isopropylcycloheptene, 3-n-butylcyclopentene, 3-n-butylcyclohexene, 3-n-butylcycloheptene, 3-t-butylcyclopentene, 3-t-butylcyclohexene, 3-t-butylcycloheptene, the isomeric pentyl-, hexyl,- heptyl-, octyl-, nonyl-, decyl-, tetradecyl-, eicosyl-cyclopentenes, cyclohexenes, cycloheptenes, 3-phenylcyclopentene, 3-phenylcyclohexene, 3-phenylcycloheptene, 3-benzylcyclopentene, 3-benzylcyclohexene, 3-benzylcycloheptene, 3-p-tolylcyclopentene, 3-p-tolylcyclohexene, 3-p-tolylcycloheptene, 3-cyclopentylcyclopentene, 3-cyclopentylcyclohexene, 3-cyclopentylcycloheptene, 3-cyclohexylcyclopentene, 3-cyclohexylcyclohexene, 3 - cyclohexylcycloheptene, 3-methoxycyclopentene, 3-methoxycyclohexene, 3-methoxycycloheptene, 3-ethoxycyclopentene, 3-ethoxycyclohexene, 3-ethoxycycloheptene, 3-propoxycyclopentene, 3-propoxycyclohexene, 3-propoxycycloheptene, 3-furfurylcyclopentene, 3-furfurylcyclohexene, 3-furfurylcycloheptene, 3-pyrylcyclopentene, 3-pyrylcyclohexene, 3-pyrylcycloheptene, 3-thiapyrylcyclopentene, 3-thiapyrylcyclohexene, 3-thiapyrylcycloheptene, 3-pyridylcyclopentene, 3-pyridylcyclohexene, 3-pyridylcycloheptene, the corresponding 4-, 5-, 6-, etc. cyclopentenes, cyclohexenes, cycloheptenes, cyclooctenes, etc., indene, 1,4-dihydronaphthalene, the correspondingly substituted indenes and 1,2-dihydronaphthalene such as 4-chloroindene, 4-bromoindene, 4-nitroindene, 4-aminoindene, 4-methoxyindene, 4-ethoxyindene, 4-methylindene, 4-ethylindene, 4-propylindene, 4-cyclopentylindene, 4-phenylindene, 4-benzylindene, 4-chloro-1,4-dihydroaphthalene, 4-bromo-1,4-dihydronaphthalene, 4 - nitro - 1,4-dihydronaphthalene, 4-amino-1,4-dihydronaphthalene, 4 - methoxy - 1,4 - dihydronaphthalene, 4-ethoxy - 1,4 - dihydronaphthalene, 4-methyl-1,4-dihydronaphthalene, 4 - ethyl - 1,4-dihydronaphthalene, 4-propyl-1,4 - dihydronaphthalene, 4 - cyclopentyl-1,4-dihydronaphthalene, 4-phenyl-1,4-dihydronaphthalene, 4-benzyl- 1,4-dihydronaphthalene, etc. It is to be understood that the aforementioned compounds are merely representative of the class of compounds which may be utilized as starting materials, and that the present invention is not necessarily limited thereto.

Examples of carboxylic acids which may be employed as the other starting material of the present invention will include acetic acid, propionic acid, butyric acid, pentanoic acid, caproic acid, heptanoic acid, caprylic acid, pelargonic acid, capric acid, etc. It is also contemplated within the scope of this invention that unsaturated carboxylic acid such as acrylic acids, including acrylic acid, crotonic acid, isocrotonic acid, vinylacetic acid, methylacrylic acid, tiglic acid, angelic acid, senecioic acid, teracrylic acid, etc. and dibasic acids such as oxalic acid, malonic acid, succinic acid, glutaric acid, adipic acid, pimelic acid, suberic acid, azelaic acid, sebacic acid, brassic acid, etc., may also be used, although not necessarily with equivalent results.

The treatment of cycloalkene of the type hereinbefore set forth in greater detail with carboxylic acid is effected in the presence of a catalyst comprising the hydrogen form of a crystalline alumino-silicate such as a faujasite. The faujasite is a zeolite, or crystalline alumino-silicate, of three-dimensional structure, the crystalline form often being described as a truncated octahedra, with pore openings in the range of from about 6 to about 15 angstroms. It is preferred to utilize the faujasite characterized by a silica-alumina ratio of at least three. The synthetic crystalline alumino-silicates are commercially available or may be prepared in any convenient manner. For example, one preferred method comprises forming an aqueous solution of sodium aluminate and sodium hydroxide and adding thereto an aqueous sodium silicate solution. The amounts of sodium silicate solution and sodium aluminate solution are such that the mole ratio of silica to alumina in the final mixture is preferably at least 3:1. The resulting mixture is heated, usually at a temperature of about 100° C., in a closed vessel to avoid any loss of water. The crystalline alumino-silicate reaction product which precipitates from the hot reaction mixture is separated and water washed until the water in equilibrium with the crystals attains a pH of from about 9 to about 12.

The finely divided faujasite dispersed in an aqueous media is thoroughly homogenized and thereafter admixed with an acidic silica hydrosol in an amount to insure a final catalyst composite comprising from about 1.0 to about 50 weight percent of faujasite dispersed in the amorphous silica matrix. The resulting slurry is allowed to age under acidic conditions whereby the silica is polymerized to a complex polysilicic acid and the pH is adjusted to about 6 or 7. Thereafter, the slurry is allowed to age for a time sufficient to develop optimum pore structure of the silica hydrogel. The aged hydrogel which is recovered from the slurry is thereafter treated with an ammonia salt solution for separation of substantially all of the alkali ions so that the final catalyst composite comprises less than about 0.1 weight percent of alkali metal. After treatment with the ammonium salt, the composite can be washed in any suitable manner such as by subjecting the hydrogel to a reslurry operation and thereafter spray drying or any other method so desired.

The composite which is substantially free of alkali metal is further treated in contact with a solution, preferably an aqueous solution, comprising ions selected from the group consisting of hydrogen ions, hydrogen ion precursors and mixtures thereof. Organic and inorganic acids are generally considered as a convenient source of hydrogen ions, such acids including sulfuric acid, nitric acid, hydrochloric acid, etc. It is also possible to utilize a hydrogen ion precursor, particularly an ammonium salt such as ammonium chloride, which is decomposible to provide hydrogen ions at a temperature below the decomposition temperature of the faujasite. Other suitable ion salts including ammonium bromide, ammonium iodine, ammonium carbonate, ammonium bicarbonate, ammonium sulfate, ammonium sulfide, ammonium isocyanate, ammonium hydroxide, ammonium molybdate, ammonium benzoate, ammonium borate, ammonium citrate, etc. The anions which are introduced to the composite as a consequence of the base exchange treatment are completely separated by water washing one or more times until the composite is free of said anions. The composite is thereafter dried, generally in an air atmosphere at an elevated temperature of from about 65° C. to about 300° C. for a predetermined period of time. The resulting composite is then in the hydrogen form of the faujasite and is in an active state, thereafter being utilized as the catalyst to effect the reaction of the present invention.

The process of this invention may be effected in any suitable manner and may comprise either a batch or continuous type operation. For example, when a batch type operation is used a quantity of the cycloalkene is placed in an appropriate apparatus along with an equimolar amount of carboxylic acid, said apparatus containing a faujasite in an active form. A particularly suitable type of apparatus which may be used in this process comprises a rotating autoclave in the event that superatmospheric pressures are to be used. The apparatus and contents thereof are then heated to the desired operating temperature which is preferably in a range of from about 100° to about 200° C. In addition, if so desired, an inert gas such as nitrogen is pressed into the apparatus until the desired operating pressure has been reached. After maintaining the apparatus at the reaction temperature for a predetermined residence time, which may range from about 0.5 up to about 10 hours or more, heating is discontinued and the apparatus and contents thereof are allowed to return to room temperature. The excess pressure, if any, is vented and the reaction mixture is recovered. The reaction mixture is then filtered to remove the catalyst and subjected to fractional distillation whereby the desired product comprising the acyloxycycloalkene is separated from the carboxylic acid and any unreacted starting materials and recovered.

It is also contemplated within the scope of this invention that the preparation of the cycloalkeneone may be effected in a continual manner of operation. The cycloalkene and the carboxylic acid are continuously charged to a reaction zone containing the catalyst of the type hereinbefore set forth in greater detail, said zone being maintained at the proper operating conditions of temperature and pressure. The cycloalkene and the carboxylic acid are charged to the reactor through separate lines or may be admixed prior to entry into said zone and charged thereto in a single stream. Upon completion of the desired residence time, the reactor effluent is continuously withdrawn and subjected to separation means whereby the desired acyloxycycloalkene is recovered while any unreacted cycloalkene and carboxylic acid are recycled to form a portion of the feed stock. Inasmuch as the catalyst is in a solid form a preferred type of operation comprises a fixed bed method in which the catalyst is disposed as a fixed bed in the reaction zone while the reactants are passed through said bed in either an upward or downward flow. Another type of operation which may be used comprises a moving bed method in which the catalyst and the reactants are passed through said zone either concurrently or countercurrently to each other. Yet another type of process which may be used comprises a slurry method in which the catalyst is carried into the reaction zone as a slurry in either one of the reactants.

Examples of acyloxycycloalkenic compounds which may be prepared according to the process of this invention include 2-cyclopenten-1-yl acetate,
2-cyclopente-1-yl propionate,
2-cyclopenten-1-yl butyrate,
2-cyclopenten-1-yl valerate,
2-cyclopenten-1-yl caproate,
2-cyclopenten-1-yl caprylate, 2-cyclopenten-1-yl caprate,
2-cyclohexen-1-yl acetate,
2-cyclohexen-1-yl propionate,
2-cyclohexen-1-yl butyrate,
2-cyclohexen-1-yl valerate,
2-cyclohexen-1-yl caproate,
2-cyclohexen-1-yl caprylate,
2-cyclohexen-1-yl caprate,
2-cyclohepten-1-yl acetate,
2-cyclohepten-1-yl propionate,
2-cyclohepten-1-yl butyrate,
2-cyclohepten-1-yl valerate,
2-cyclohepten-1-yl caproate,
2-cyclohepten-1-yl caprylate,
2-cyclohepten-1-yl caprate,
4-chloro-2-cyclopenten-1-yl acetate,
4-chloro-2-cyclopenten-1-yl propionate,
4-chloro-2-cyclopenten-1-yl butyrate,
4-chloro-2-cyclopenten-1-yl valerate,
4-chloro-2-cyclopenten-1-yl caproate,
4-chloro-2-cyclohexen-1-yl acetate,
4-chloro-2-cyclohexen-1-yl propionate,
4-chloro-2-cyclohexen-1-yl butyrate,
4-chloro-2-cyclohexen-1-yl valerate,
4-chloro-2-cyclohexen-1-yl caproate,
4-chloro-2-cycloheptene-1-yl acetate,
4-chloro-2-cyclohepten-1-yl propionate,
4-chloro-2-cyclohepten-1-yl butyrate,
4-cyclo-2-cyclohepten-1-yl valerate,
4-chloro-2-cycloheptene-1-yl caproate,
4-nitro-2-cyclopenten-1-yl acetate,
4-nitro-2-cyclopenten-1-yl propionate,
4-nitro-2-cyclopenten-1-yl butyrate,
4-nitro-2-cyclopenten-1-yl valerate,
4-nitro-2-cyclopenten-1-yl caproate,
4-nitro-2-cyclohexen-1-yl acetate,
4-nitro-2-cyclohexen-1-yl propionate,
4-nitro-2-cyclohexen-1-yl butyrate,
4-nitro-2-cyclohexen-1-yl valerate,
4-nitro-2-cyclohexen-1-yl caproate,
4-amino-2-cyclohepten-1-yl acetate,
4-amino-2-cyclohepten-1-yl propionate,
4-amino-2-cyclohepten-1-yl butyrate,
4-amino-2-cyclohepten-1-yl valerate,
4-amino-2-cyclohepten-1-yl caproate,
4-methyl-2-cyclopenten-1-yl acetate,
4-methyl-2-cyclopenten-1-yl propionate,
4-methyl-2-cyclopenten-1-yl butyrate,
4-methyl-2-cyclopenten-1-yl valerate,
4-methyl-2-cyclopenten-1-yl caproate,
4-methyl-2-cyclohexen-1-yl acetate,
4-methyl-2-cyclohexen-1-yl propionate,
4-methyl-2-cyclohexen-1-yl butyrate,
4-methyl-2-cyclohexen-1-yl valerate,
4-methyl-2-cyclohexen-1-yl caproate,
4-ethyl-2-cyclohepten-1-yl acetate,
4-ethyl-2-cyclohepten-1-yl propionate,
4-ethyl-2-cyclohepten-1-yl butyrate,
4-ethyl-2-cyclohepten-1-yl valerate,
4-ethyl-2-cyclohepten-1-yl caproate,
4-cyclohexyl-2-cyclopenten-1-yl acetate,
4-cyclohexyl-2-cyclopenten-1-yl propionate,
4-cyclohexyl-2-cyclopenten-1-yl butyrate,
4-cyclohexyl-2-cyclopenten-1-yl valerate,
4-cyclohexyl-2-cyclopenten-1-yl caproate,
4-phenyl-2-cyclohexen-1-yl acetate,
4-phenyl-2-cyclohexen-1-yl proprionate,
4-phenyl-2-cyclohexen-1-yl butyrate,
4-phenyl-2-cyclohexen-1-yl valerate,
4-phenyl-2-cyclohexen-1-yl caproate,
4-benzyl-2-cyclohepten-1-yl acetate,
4-benzyl-2-cyclohepten-1-yl propionate,
4-benzyl-2-cyclohepten-1-yl butyrate,
4-benzyl-2-cyclohepten-1-yl valerate,
4-benzyl-2-cyclohepten-1-yl caproate,
indene-3-yl acetate,
indene-3-yl propionate,
indene-3-yl butyrate,
indene-3-yl valerate,
indene-3-yl caproate,
4-chloroindene-3-yl acetate,
4-chloroindene-3-yl propionate,
4-chloroindene-3-yl butyrate,
4-chloroindene-3-yl valerate,
4-chlorindene-3-caproate, etc. It is to be understood that the aforementioned compounds are merely representative of the type of acyloxycycloalkenic compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 15 grams (0.25 mole) of acetic acid, 21 grams (0.25 mole) of cyclohexene and 0.2 gram of a faujasite in the hydrogen form were sealed into an autoclave. The autoclave was then heated to a temperature of 150° C. and maintained thereat for a period of 4 hours. At the end of this time, heating was discontinued, the autoclave and contents thereof were cooled to room temperature and opened. The reaction mixture was recovered and filtered to separate the product from the catalyst. The reaction product was subjected to fractional distillation and the cut comprising 2-cyclohexen-1-yl acetate was recovered. The presence of this compound was confirmed by means of a gas-liquid chromatograph and infrared analysis.

EXAMPLE II

A mixture of 13.6 grams (0.2 mole) of cyclopentene and 14.8 grams (0.2 mole) of propionic acid is placed in the glass liner of a rotating autoclave, said liner containing 0.2 gram of the catalyst comprising a faujasite in the hydrogen form. The liner is sealed in the autoclave which is thereafter heated to a temperature of 150° C. and maintained thereat for a period of 4 hours. At the end of this time, heating is discontinued and the autoclave is allowed to return to room temperature. After opening the autoclave the reaction mixture is recovered and the product is separated from the catalyst by means of filtration. The liquid product is thereafter subjected to fractional distillation and the desired product comprising 2-cyclopenten-1-yl propionate is recovered therefrom.

EXAMPLE III

A mixture comprising 15 grams (0.25 mole) of acetic acid, 24 grams (0.25 mole) of 3-methylcyclohexene and 2 grams of a faujasite in the hydrogen form is placed in an autoclave. The autoclave is sealed and nitrogen is pressed in until an initial pressure of 25 atmospheres is reached. The autoclave and contents thereof are thereafter heated to a temperature of 150° C. and maintained thereat for a period of 4 hours. At the end of this time, the autoclave and contents thereof are allowed to return to room temperature, thereafter reaching room temperature, the excess pressure is discharged. The autoclave is opened and the reaction product is recovered and separated from the catalyst by means of filtration. The liquid product is then subjected to fractional distillation and the desired product comprising 4-methyl-2-cyclohexen-1-yl acetate is recovered therefrom.

EXAMPLE IV

In this example 29 grams (0.25 mole) of indene and 15 grams (0.25 mole) of acetic acid is placed in an autoclave along with 0.2 gram of faujasite in the hydrogen form. The autoclave is sealed and heated to a temperature of about 200° C. for a period of 4 hours. At the end of this time, heating is discontinued and the autoclave allowed to return to room temperature. The autoclave is opened and the reaction product is recovered. The liquid product is separated from the catalyst by means of filtration and subjected to fractional distillation under reduced pressure, the desired product comprising indene-3-yl acetate being recovered therefrom.

EXAMPLE V

A mixture comprising 22 grams (0.25 mole) of butyric acid, 21 grams (0.25 mole) of cyclohexene and 2 grams of a faujasite in the hydrogen form is sealed into the liner of a rotating autoclave. Following this, nitrogen is pressed in until an initial pressure of 25 atmospheres is reached and the autoclave is then heated to a temperature of 150° C. After maintaining this temperature for a period of 4 hours, heating is discontinued and the autoclave is allowed to return to room temperature. The excess pressure is discharged, the autoclave is opened and the reaction product is separated from the catalyst by means of filtration. Thereafter, the liquid product is subjected to fractional distillation under reduced pressure, the desired product comprising 2-cyclohexen-1-yl butyrate being recovered therefrom.

I claim as my invention:

1. A process for the acyloxylation of a cycloalkene which comprises treating said cycloalkene with an alkanoic acid containing up to 10 carbon atoms in the presence of a catalytically effective amount of the hydrogen form of a crystalline aluminosilicate, at a temperature of about ambient to 250° C. and a pressure of about 1 to 100 atmospheres, and recovering the resultant acyloxycycloalkene, said cycloalkene being selected from the group consisting of:
    (a) unsubstituted or mono-substituted monocyclic cycloalkenes having from 5 to 8 carbon atoms in the ring, the substituent being selected from the group consisting of $C_1$-$C_{20}$ alkyl, phenyl, tolyl, benzyl, $C_5$ or $C_6$ cycloalkyl, lower alkoxy, halogen, nitro, amino, furfuryl, pyryl, thiapyryl and pyridyl;
    (b) unsubstituted or mono-substituted indene, the substituent being selected from the group consisting of lower alkyl, phenyl, benzyl, cyclopentyl, lower alkoxy, chlorine, bromine, nitro and amino; and,
    (c) unsubstituted or mono-substituted 1,4-dihydronaphthalene, the substituent being selected from the group consisting of lower alkyl, phenyl, benzyl, cyclopentyl, lower alkoxy, chlorine, bromine, nitro and amino.

2. The process as set forth in claim 1 in which said aluminosilicate is the hydrogen form of faujasite.

3. The process as set forth in claim 1 in which said alkanoic acid is acetic acid.

4. The process as set forth in claim 1 in which said alkanoic acid is propionic acid.

5. The process as set forth in claim 1 in which said alkanoic acid is butyric acid.

6. The process as set forth in claim 3 in which said cycloalkene is cyclohexene and said acyloxycycloalkene is 2-cyclohexen-1-yl acetate.

7. The process as set forth in claim 4 in which said cycloalkene is cyclopentene and said acyloxycycloalkene is 2-cyclopenten-1-yl propionate.

8. The process as set forth in claim 3 in which said cycloalkene is 3-methylcyclohexene and said acyloxycycloalkene is 4-methyl-2-cyclohexen-1-yl acetate.

9. The process as set forth in claim 3 in which said cycloalkene is indene and said acyloxycycloalkene is indene-3-yl acetate.

10. The process as set forth in claim 5 in which said cycloalkene is cyclohexene and said acyloxycycloalkene is 2-cyclohexen-1-yl butyrate.

References Cited

UNITED STATES PATENTS 3,492,341  1/1970  Trevillyan _____ 260—497

OTHER REFERENCES

March, Advanced Organic Chemistry, McGraw-Hill (1968), p. 545.

LORRAINE A. WEINBERGER, Primary Examiner

R. D. KELLY, Assistant Examiner

U.S. Cl. X.R.

260—295 R, 327 R, 345.8, 347.4, 410, 485 L, 485 H, 486 R, 486 H, 488 R